(12) United States Patent
Kantschuk et al.

(10) Patent No.: US 7,046,751 B1
(45) Date of Patent: May 16, 2006

(54) DYNAMIC ALLOCATION OF NEXT CANCELLATION FILTERS IN A MODEM POOL ENVIRONMENT

(75) Inventors: Amir Kantschuk, Ramat Gan (IL); Sharon Peleg, Hod Hasharon (IL); Maya Bar-El, Petah Tikva (IL); David Vaaknin, Zur Yigal (IL); Gilad Rozen, Herzeliya (IL)

(73) Assignee: Actelis Networks Inc., Fremont, CA (US)

( * ) Notice: Subject to any disclaimer, the term of this patent is extended or adjusted under 35 U.S.C. 154(b) by 983 days.

(21) Appl. No.: 09/721,753

(22) Filed: Nov. 27, 2000

Related U.S. Application Data (63) Continuation-in-part of application No. 09/510,550, filed on Feb. 22, 2000.

(60) Provisional application No. 60/121,228, filed on Feb. 23, 1999.

(51) Int. Cl.
*H04L 25/08* (2006.01)
*H03K 5/01* (2006.01)

(52) U.S. Cl. .................. 375/346; 375/222; 375/350; 370/201

(58) Field of Classification Search ............... 375/219, 375/346, 348, 222, 350; 370/201, 286, 289–291; 379/406.01, 406.08; 455/570; 708/300
See application file for complete search history.

(56) References Cited

U.S. PATENT DOCUMENTS

| | | | | |
|---|---|---|---|---|
| 5,825,753 A | * | 10/1998 | Betts et al. | 370/289 |
| 5,887,032 A | | 3/1999 | Cioffi | |
| 5,970,088 A | * | 10/1999 | Chen | 375/222 |
| 6,160,790 A | * | 12/2000 | Bremer | 370/201 |
| 6,201,796 B1 | | 3/2001 | Agazzi et al. | |
| 6,633,894 B1 | * | 10/2003 | Cole | 708/300 |

OTHER PUBLICATIONS

U.S. Appl. No. 09/643,821, filed Aug. 22, 2000, Shteiman.
U.S. Appl. No. 09/510,550, filed Feb. 22, 2000, Barlev et al.

* cited by examiner

*Primary Examiner*—Young T. Tse
*Assistant Examiner*—Edith Chang
(74) *Attorney, Agent, or Firm*—Pearl Cohen Zedek Latzer, LLP (57) ABSTRACT

In a communications system having a modem pool for communicating via a communications channel, the modem pool including a plurality of modems and having a plurality A of NEXT cancellation filters, a) measuring NEXT impairment caused to at least one target modem among the plurality of modems by at least one disturber modem among the plurality of modems, b) allocating P filters among the A filters as probe filters, where P>=1, c) allocating at least one of the remaining A-P filters among the filters to cancel NEXT from at least one disturber modem among the plurality of modems, and d) measuring, using at least one of the P probe filters, NEXT impairment caused to at least one target modem among the plurality of modems by at least one candidate disturber modem among the plurality of modems to which no A-P filter is currently allocated.

26 Claims, 9 Drawing Sheets

DYNAMIC ALLOCATION OF NEXT CANCELLATION FILTERS IN A MODEM POOL ENVIRONMENT

CROSS REFERENCE TO RELATED APPLICATIONS

This application is a Continuation-In-Part application of U.S. patent application Ser. No. 09/510,550 filed Feb. 22, 2000, and entitled "High Speed Access System Over Copper Cable Plant," that claims priority from U.S. Provisional Application Ser. No. 60/121,228, filed Feb. 23, 1999, and entitled "Access Express-Very High Data Rate Communication Channels Over Copper," both hereby incorporated by reference in their entirety.

FIELD OF THE INVENTION

The present invention relates to telecommunications systems in general, and more particularly to dynamic allocation of NEXT cancellation filters in a modem pool environment.

BACKGROUND OF THE INVENTION

The ever-increasing demand for high-speed data communications services and greater bandwidth is largely due to the popularity of the Internet and other data-intensive, high bandwidth applications. Both businesses and consumers are demanding higher bandwidth connections and faster Internet access. Another source for this demand is the increasing use by businesses of data communications networks, most notably the Internet, for the transmission of documents and electronic mail.

Digital Subscriber Line (DSL) technology provides one approach to addressing the demand for high-speed telecommunications service. DSL technology refers to several types of services that use advanced modem elements to transmit digital signals from a data source over copper wires. Many telephone companies have embraced DSL technology as an immediate broadband solution to serve the current demand by getting more out of their existing copper infrastructure. DSL modem elements permit high data rate transmission of data over the access segment of the public switched telephone network (PSTN) at multiple megabit speeds using sophisticated signal processing techniques that permit voice and data to travel simultaneously over the same analog copper twisted pair wire.

One of the challenges facing DSL technology is that of near-end cross-talk (NEXT) cancellation. NEXT is defined as the cross-talk interference between the receiving path and the transmitting path of different transceivers at the same end of a communications channel that make use of wiring that shares the same cable. The NEXT effect in a cable depends on the number of interfering lines, and increases as the bandwidth that the signals occupy increases. In a modem pool environment where streams of data are distributed to many lines within a single, dedicated cable, the NEXT that the receivers need to overcome is mainly generated by the transmissions of the modem pool itself. Since such a system has access to the transmitted information for a plurality of modems, such information may be used to cancel the interference that leaks into the receivers, thus increasing the noise floor of each receiver.

Another cross-talk phenomena is known as far-end cross-talk (FEXT), which is defined as the cross-talk interference between the receiving path and the transmitting path of different transceivers at opposite ends of a communications channel that make use of wiring that shares the same cable.

In classic NEXT cancellation, a transmitter transmitting via one wire or wire grouping (e.g., twisted pair) affects the receiver receiving via another wire or wire grouping. For each transmit and receive path of an individual modem, a hybrid circuit separates the received signal from the transmitted interfering signal, but since the hybrid cannot completely separate the transmit path from the receive path, some of the transmitted signal leaks into the receiver and becomes an interfering signal. A canceller then filters out the effect of the interfering signal, resulting in a "cleaned" received signal. For a single modem, this problem may be addressed using classic echo cancellation techniques. In a modem pool environment, however, where several modems transmit via a shared cable, there are currently no techniques that effectively address how each receiver takes into account all other interfering transmitters.

In a conventional approach for NEXT cancellation in a modem pool environment, all modems on both sides of the communications channel are activated, as are all adaptive NEXT filters, and the NEXT filters are allowed to converge over time. Unfortunately, in such an approach the received signal is comprised not only of NEXT, but of the far signal, self-echo, FEXT, and other noise as well. Since self-echo and the other noise components are collectively a much bigger factor than NEXT, the NEXT filters will necessarily converge more slowly and less efficiently than were other noise components not present. Furthermore, such systems are relatively complex to implement, since the number of filters required would equal the square of the number of modems in the pool.

SUMMARY OF THE INVENTION

The present invention seeks to provide techniques for dynamic allocation of NEXT cancellation filters in a modem pool environment. The dynamic allocation of NEXT cancellation filters in a modem pool is highly desirable where the number of NEXT cancellation filters available to the system is smaller than the number of disturbers influencing the modems' performance. The dynamic nature of the present invention adapts to environmental conditions and the physical behavior of copper pairs, where the NEXT transfer functions change over time.

In one aspect of the present invention, in a communications system having a modem pool for communicating via a communications channel, the modem pool including a plurality of modems and having a plurality A of NEXT cancellation filters, a method for NEXT cancellation filter allocation is provided including the steps of a) measuring NEXT impairment caused to at least one target modem among the plurality of modems by at least one disturber modem among the plurality of modems, b) allocating P filters among the A filters as probe filters, where P>=1, c) allocating at least one of the remaining A−P filters among the filters to cancel NEXT from at least one disturber modem among the plurality of modems, and d) measuring, using at least one of the P probe filters, NEXT impairment caused to at least one target modem among the plurality of modems by at least one candidate disturber modem among the plurality of modems to which no A−P filter is currently allocated.

In another aspect of the present invention the method further includes e) reallocating at least one currently allocated one of the A−P filters to the P probe filters.

In another aspect of the present invention the reallocating step e) includes reallocating if the NEXT impairment caused by the candidate disturber modem is greater than the NEXT impairment caused by any other disturber modem among the plurality of modems to which an A–P filter is currently allocated.

In another aspect of the present invention the measuring step includes measuring the NEXT impairment as the absolute sum of all NEXT cancellation filter coefficients of the filters.

In another aspect of the present invention the allocating step c) includes allocating in order of NEXT impairment from greater impairment to lower impairment.

In another aspect of the present invention the allocating step includes allocating any of the filters to only one of the modems.

In another aspect of the present invention the reallocating step includes reallocating any of the filters to only one of the modems.

In another aspect of the present invention the allocating step includes allocating any of the filters to at least two of the modems at different times.

In another aspect of the present invention the reallocating step includes reallocating any of the filters to at least two of the modems at different times.

In another aspect of the present invention the method further includes f) measuring the target modem's signal-to-noise ratio (SNR) prior to the allocating step b), and g) measuring the target modem's SNR once the probe filter has reached convergence, and where the reallocating step e) is performed if the SNR measured in step g) is greater than the SNR measured in step f).

In another aspect of the present invention the method further includes f) measuring the target modem's signal-to-noise ratio (SNR) and data rate prior to the allocating step b), and g) measuring the target modem's SNR once the probe filter has reached convergence, and h) estimating the target modem's data rate based on the SNR measured in step g), and where the reallocating step e) is performed if the data rate estimated in step h) is greater than the data rate measured in step f).

In another aspect of the present invention the estimating step h) is performed if the SNR measured in step g) is greater than the SNR measured in step f).

In another aspect of the present invention the plurality of modems number at least one more than the plurality of NEXT cancellation filters.

In another aspect of the present invention a communications system is provided including a modem pool for communicating via a communications channel, the modem pool including a plurality of modems and a plurality A of NEXT cancellation filters, the modem pool being operative to a) measure NEXT impairment caused to at least one target modem among the plurality of modems by at least one disturber modem among the plurality of modems, b) allocate P filters among the A filters as probe filters, where P>=1, c) allocate at least one of the remaining A–P filters among the filters to cancel NEXT from at least one disturber modem among the plurality of modems, and d) measure, using at least one of the P probe filters, NEXT impairment caused to at least one target modem among the plurality of modems by at least one candidate disturber modem among the plurality of modems to which no A–P filter is currently allocated.

In another aspect of the present invention the modem pool is additionally operative to e) reallocate at least one currently allocated one of the A–P filters to the P probe filters.

In another aspect of the present invention the modem pool is additionally operative to reallocate if the NEXT impairment caused by the candidate disturber modem is greater than the NEXT impairment caused by any other disturber modem among the plurality of modems to which an A–P filter is currently allocated.

In another aspect of the present invention the modem pool is operative to measure the NEXT impairment as the absolute sum of all NEXT cancellation filter coefficients of the filters.

In another aspect of the present invention the modem pool is operative to allocate any of the A–P filters in order of NEXT impairment from greater impairment to lower impairment.

In another aspect of the present invention the modem pool is operative to allocate any of the filters to only one of the modems.

In another aspect of the present invention the modem pool is operative to reallocate any of the filters to only one of the modems.

In another aspect of the present invention the modem pool is operative to allocate any of the filters to at least two of the modems at different times.

In another aspect of the present invention the modem pool is operative to reallocate any of the filters to at least two of the modems at different times.

In another aspect of the present invention the modem pool is operative to f) measure the target modem's signal-to-noise ratio (SNR) prior to performing the allocating step b), and g) measure the target modem's SNR once the probe filter has reached convergence, and perform the reallocating step e) if the SNR measured in step g) is greater than the SNR measured in step f).

In another aspect of the present invention the modem pool is operative to f) measure the target modem's signal-to-noise ratio (SNR) and data rate prior to performing the allocating step b), and g) measure the target modem's SNR once the probe filter has reached convergence, and h) estimate the target modem's data rate based on the SNR measured in step g), and perform the reallocating step e) if the data rate estimated in step h) is greater than the data rate measured in step f).

In another aspect of the present invention the modem pool is operative to perform the estimating step h) if the SNR measured in step g) is greater than the SNR measured in step f).

In another aspect of the present invention the plurality of modems number at least one more than the plurality of NEXT cancellation filters.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
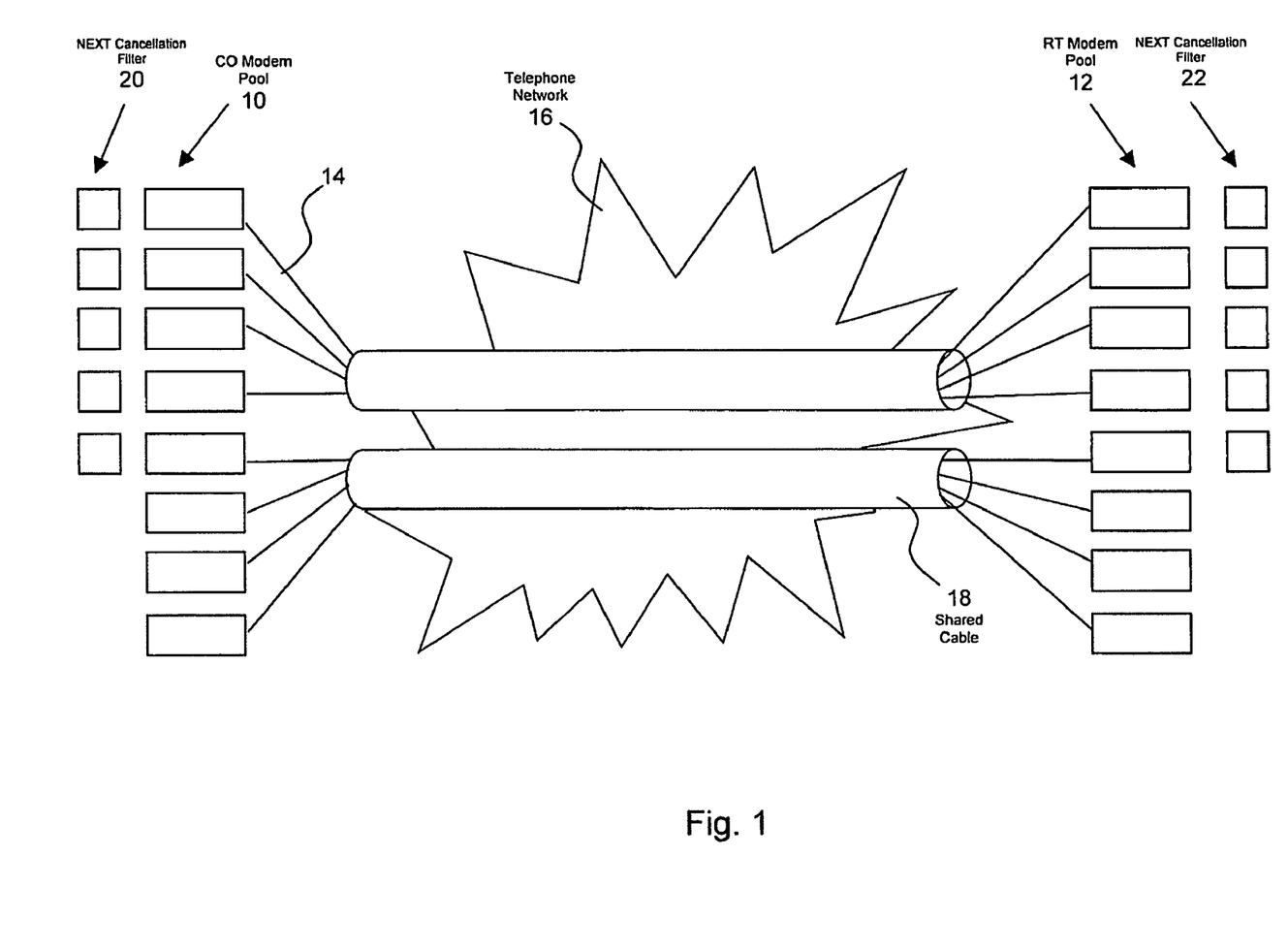
FIG. 1 is a pictorial illustration of a modem pool arrangement useful in understanding the present invention.

Reference is now made to FIG. 1 which is a pictorial illustration of a modem pool arrangement useful in understanding the present invention. A first modem pool, generally referenced 10, and comprising a plurality of individual modems is seen in communication with a second modem pool, generally referenced 12, via a plurality of connections 14 over a telephone network 16. Connections 14 are typically copper wire pairs arranged in one or more bundles 18. Modem pools 10 and 12 typically operate from central office (CO) and remote terminal (RT) locations respectively, and are alternatively referred to herein as CO 10 and RT 12. The modem pools preferably operate in a coordinated manner, such as is described in Applicant/assignee's U.S. patent application Ser. No. 09/510,550 filed Feb. 22, 2000, and entitled "High Speed Access System Over Copper Cable Plant," that claims priority from U.S. Provisional Application Ser. No. 60/121,228, filed Feb. 23, 1999, and entitled "Access Express-Very High Data Rate Communication Channels Over Copper," both hereby incorporated by reference in their entirety.

Each modem pool in FIG. 1 typically includes one or more NEXT cancellation filters 20 and 22 respectively, the operation of which is described in greater detail hereinbelow with reference to FIG. 2. It is a particular feature of the present invention that, in a modem pool of N modems, less than $N^2$ NEXT cancellation filters may be used in support of NEXT cancellation.

Figure 2:
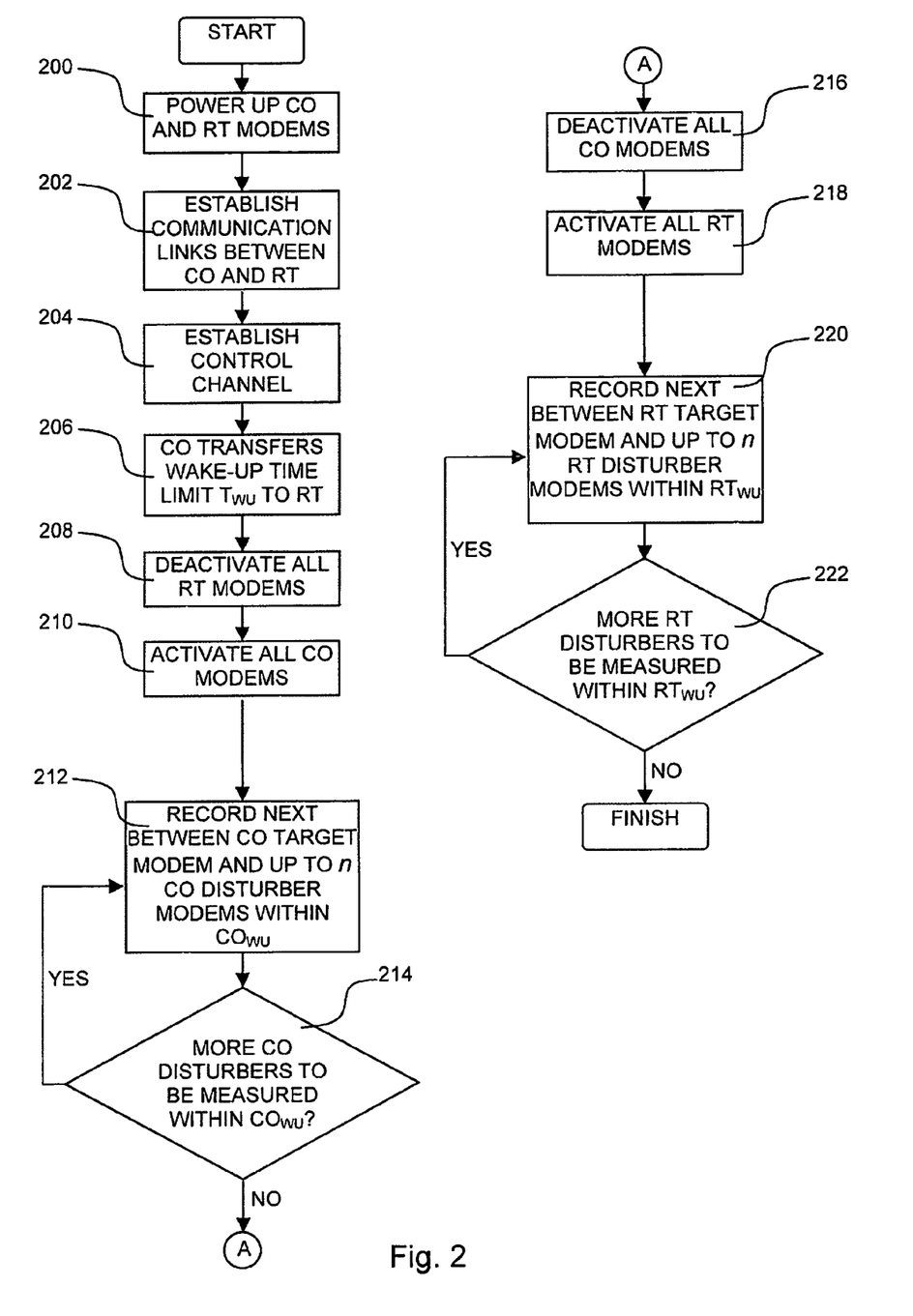
FIG. 2 is a flowchart illustration of a method of modem wake-up of the system of FIG. 1, useful in understanding the present invention.

Reference is now made to FIG. 2, which is a flowchart illustration of a method of modem wake-up of the system of FIG. 1, useful in understanding the present invention. In the method of FIG. 2 the modems of CO 10 and RT 12 are powered-up (step 200), and communications links are established between CO 10 and RT 12, typically at their minimum transmission rate (step 202). A system control channel is then established using at least one of the communication links (step 204). CO 10 then transfers a predetermined wake-up time limit, $T_{wu}$, to RT 12 using the control channel (step 206). Once $T_{wu}$ is received at RT 12, one or more, and preferably all, of the RT 12 modems are deactivated and thereby prevented from communicating with CO 10, typically by placing the modem in a receive-only mode or by turning the modem off (step 208).

During a first time period $T_{wu}$, referred to as $CO_{wu}$, one or more, and preferably all, of the modems at CO 10 are activated, typically such that the transmitted signal occupies the entire usable bandwidth, such as by operating at their maximum transmission rate and/or maximum power (step 210). Throughout this phase the copper lines are preferably used in a simplex mode. The n NEXT cancellation filters 20 at CO 10 are activated for a single target modem, and the NEXT transfer function is measured and recorded, typically in a central database, for the target modem and each of up to n "disturber" modems of the CO 10 modem pool (step 212). Each NEXT transfer function may be measured in the time domain and/or the frequency domain, and reflects the NEXT experienced by the target modem due to a disturber modem with which the target modem is paired during the measurement. NEXT measurement may be accomplished by an adaptive FIR filter, trained to mimic the cross lines transfer function. Step 212 may be repeated for several NEXT measurement cycles, particularly where there are fewer NEXT cancellation filters than disturber modems (step 214). The NEXT cancellation filters 20 preferably measure different modem pairs during each cycle, provided that $CO_{wu}$ hasn't elapsed. For example, if there are 25 filters available to measure the NEXT from 100 potential disturber modems, four measurement cycles would be required for each modem being measured.

Once the $CO_{wu}$ time period has elapsed, one or more, and preferably all, of the modems at CO 10 are deactivated and thereby prevented from communicating with RT 12, typically by placing the modem in a receive-only mode or by turning the modem off (step 216), and steps 210–214 may be repeated for the modems at RT 12 for an additional $T_{wu}$ time period, referred to as $RT_{wu}$. One or more, and preferably all, of the modems at RT 12 are activated, typically such that the transmitted signal occupies the entire usable bandwidth, such as by operating at their maximum transmission rate and/or maximum power (step 218), the m NEXT cancellation filters 22 at RT 12 are activated for a single target modem, and the NEXT transfer function is measured and recorded for the target modem and each of up to m disturber modems of the RT 12 modem pool (step 220), with step 220 being repeated for several NEXT measurement cycles as necessary to measure one or more, and preferably all, of target modem-disturber pairs prior to the $RT_{wu}$ time period elapsing (step 222).

The NEXT measurements taken during the wake-up process are thus free of far signal and FEXT noise components and may be subsequently used to initialize the NEXT cancellation filters when beginning normal operation. Preferably, after the method of FIG. 2 is carried out, CO 10 and RT 12 configure their modems to a stable, agreed-upon, or otherwise predetermined rate (e.g. their minimum transmission rates) and re-establish a control channel. CO 10 then activates its NEXT cancellation filters for one or more, and preferably all, of its modems and instructs RT 12 to likewise activate its NEXT cancellation filters for one or more, and preferably all, of its modems. The NEXT cancellation filters then converge and begin canceling NEXT based on the NEXT transfer functions measured during wake-up. Preferred methods of NEXT cancellation are described in Assignee's U.S. patent application Ser. No. 09/643,821 entitled "Next Cancellation for Modem Pools" and filed on Aug. 22, 2000, hereby incorporated by reference in its entirety. The NEXT cancellation filter's convergence criteria may be based on error signal of the filter adaptation process using conventional techniques.

As an alternative to steps 204 and 206 above, the time periods $T_{wu}$ or $RT_{wu}$ may be preset at RT 12, and not communicated to RT 12 by CO 10. $CO_{wu}$ may likewise be preset at CO 10. Furthermore, $CO_{wu}$ and $RT_{wu}$ need not be of equal length.

Figure 3:
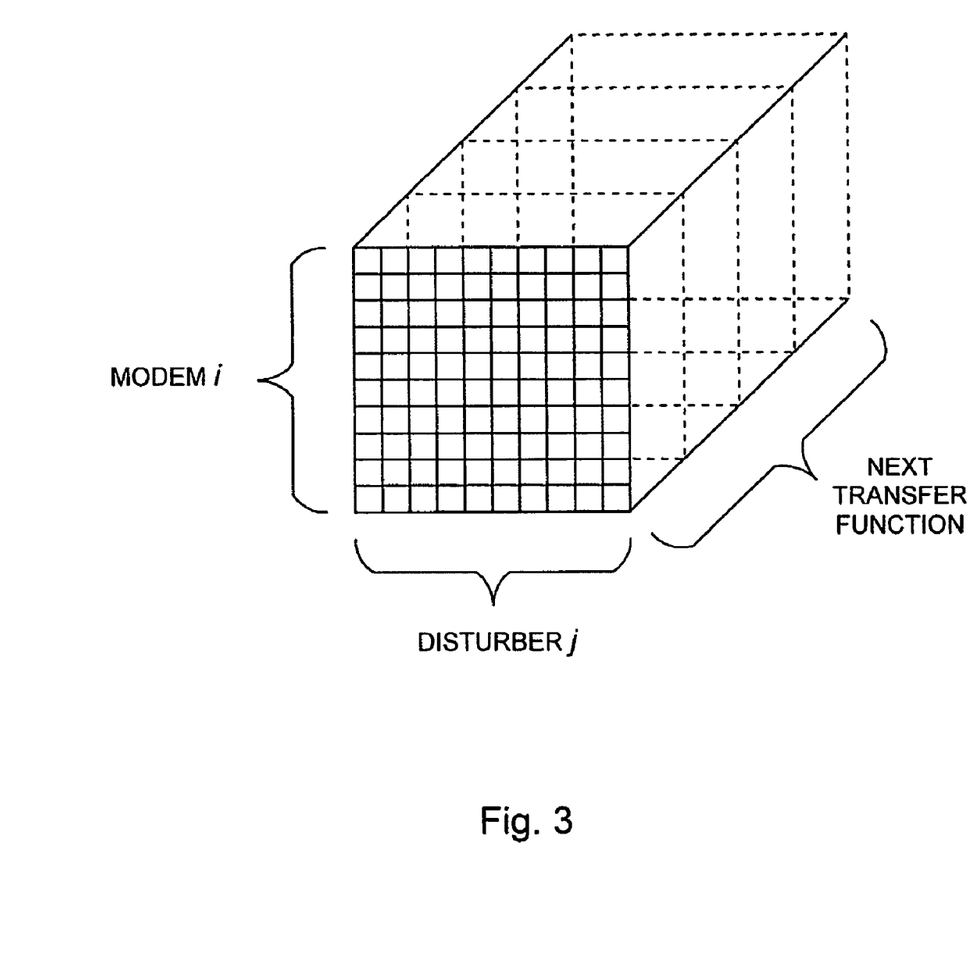
FIG. 3 is a pictorial illustration of a NEXT transfer function matrix constructed using the method of FIG. 2.

Reference is now made to FIG. 3, which is a pictorial illustration of a NEXT transfer function matrix constructed using the method of FIG. 2. As is shown in FIG. 3, for one or more, and preferably all, of the modems i in a modem pool, the method of FIG. 2 may be used to determine the NEXT transfer function vector for one or more, and preferably all, disturber modems j. The wake-up time limit $T_{wu}$ is preferably of a sufficient length for the complete NEXT transfer function matrix of FIG. 3 to be constructed in one or more measurement cycles as described hereinabove.

Figure 4:
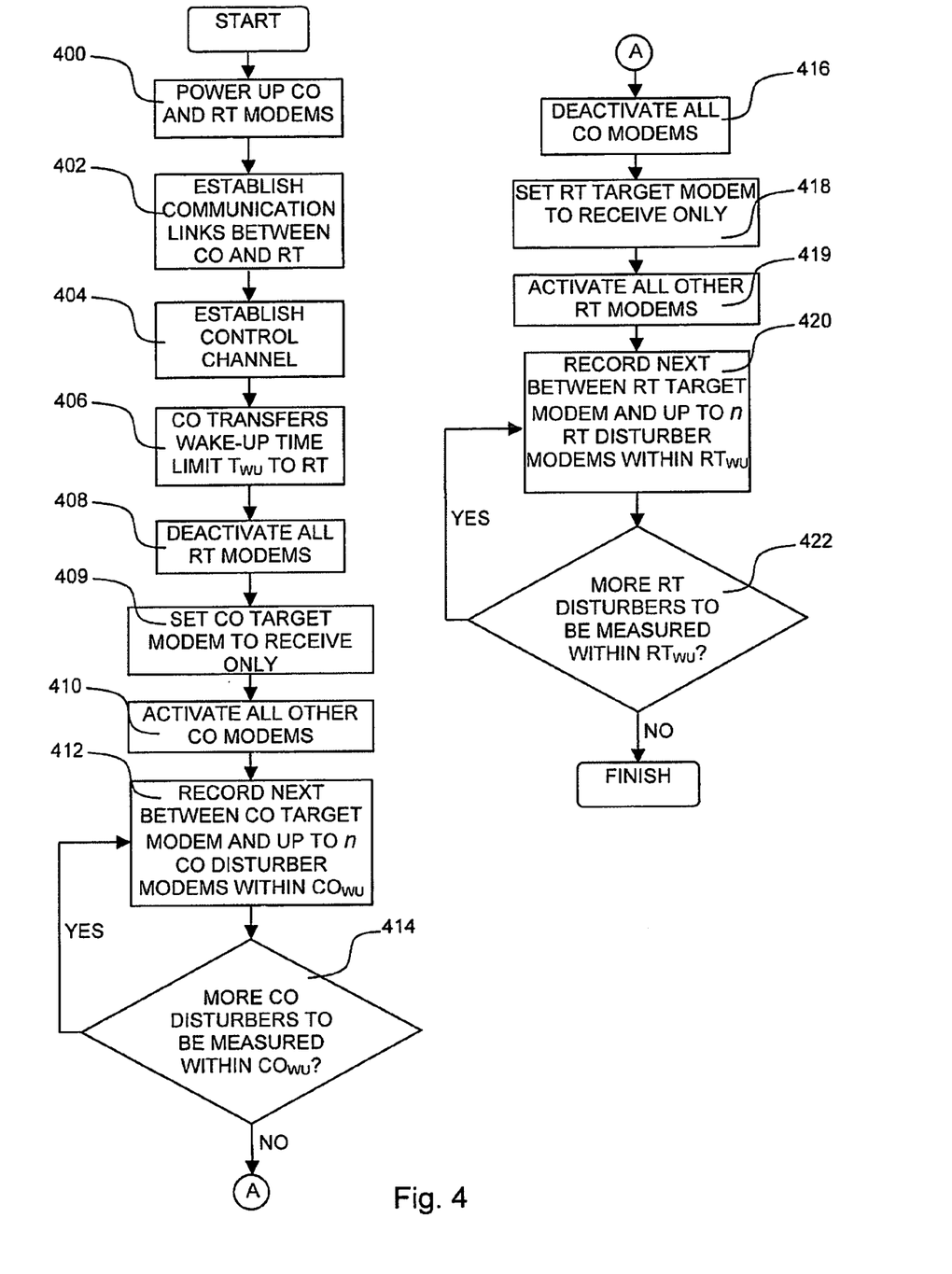
FIG. 4 is a flowchart illustration of a method of modem wake-up of the system of FIG. 1, useful in understanding the present invention.

Reference is now made to FIG. 4, which is a flowchart illustration of a method of modem wake-up of the system of FIG. 1, useful in understanding the present invention. The method of FIG. 4 is substantially similar to the method of FIG. 2 with the notable exception that the target modem whose NEXT is being measured is set to receive-only mode while one or more, and preferably all, other modems are activated at their maximum transmission rate and maximum power. Setting one modem to receive-only and one or more, and preferably all, potential disturbers to transmit ensures that only disturber NEXT is measured, and that the self-echo of the target modem is eliminated as a noise component.

Figure 5:
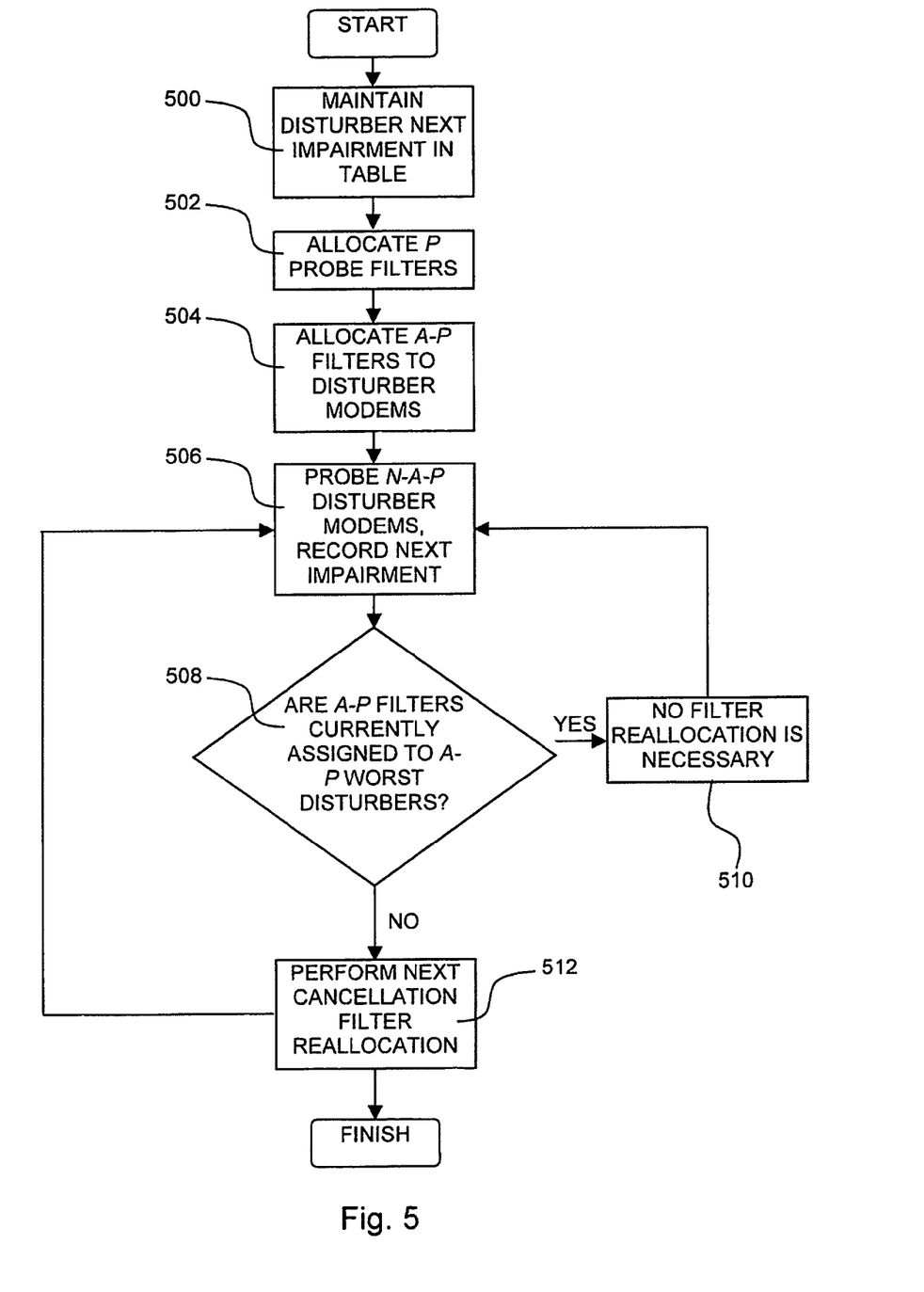
FIG. 5 is a flowchart illustration of a method of dynamic allocation of NEXT cancellation filters, operative in accordance with a preferred embodiment of the present invention.

Reference is now made to FIG. 5, which is a flowchart illustration of a method of dynamic allocation of NEXT cancellation filters, operative in accordance with a preferred embodiment of the present invention. The method of FIG. 5 may be applied to CO 10 or RT 12 of FIG. 1, or to both modem pools, and is typically applied subsequent to performing modem wake-up, such as is described hereinabove with reference to FIGS. 2 and 4. The method of FIG. 5 is particularly useful where there are fewer NEXT cancellation filters available to a given target modem for canceling the NEXT from disturber modems than there are disturber modems, and where the number of NEXT cancellation filters available for a given modem is fixed.

In the method of FIG. 5 a disturber table is maintained for each modem in the modem pool, indicating the level of NEXT impairment that the modem experiences from other disturber modems in the modem pool (step 500). The NEXT impairment may be quantified using any known NEXT quantification technique, or as follows. For a target modem i and a disturber modem j having a NEXT cancellation filter with h coefficients, the NEXT impairment may be expressed as the absolute sum of all NEXT cancellation filter coefficients as follows:

NEXT Impairment $$ij = \sum_{k=1}^{h} |C_{i,j}(k)|$$

The NEXT cancellation measurement assumes that for each NEXT cancellation filter the greater the absolute sum of the NEXT cancellation filter coefficients, the greater the increase in the NEXT effect of disturber j on target modem i. Thus, canceling the NEXT from disturber j will improve the modem i SNR more significantly than canceling the NEXT from disturber k, having a lower NEXT impairment value.

Where there are A NEXT cancellation filters available for a target modem having N potential disturbers, and A<N, P filters are preferably allocated as probe filters (step 502) where P>=1, and one or more, and preferably all, of the remaining A–P ("A minus P") filters are allocated to cancel NEXT from disturber modems, with the assignments being recorded in the disturber table (step 504). The allocation of filters to disturbers is preferably performed in order of NEXT impairment, from greater impairment to lower impairment.

After modem wake-up and initial NEXT cancellation filter allocation, and preferably throughout steady state, the P probe filters cycle through one or more, and preferably all, of the N–A–P ("N minus A minus P") disturber modems to which NEXT cancellation filters have not been allocated and measures the NEXT impairment caused by those disturber modems, with the NEXT impairment measurements being recorded in the disturber table (step 506). At any time during probing, and preferably after every C complete probing cycles where all N–A–P disturber modems have been measured, where C>=1, the disturber table is reviewed to determine whether the A–P disturber modems causing the greatest NEXT impairment are those to which the A–P NEXT cancellation filters have been allocated (step 508). If the A–P NEXT cancellation filters are currently allocated to the A–P disturber modems causing the greatest NEXT impairment, then no reallocation is necessary (step 510). If, however, one or more of the A–P disturber modems causing the greatest NEXT impairment does not currently have a NEXT cancellation filter allocated to it, hereinafter referred to as a "candidate" disturber, NEXT cancellation filter reallocation is performed (step 512), preferably using one of the methods described hereinbelow with reference to FIGS. 6, 7, and 8.

Figure 6:
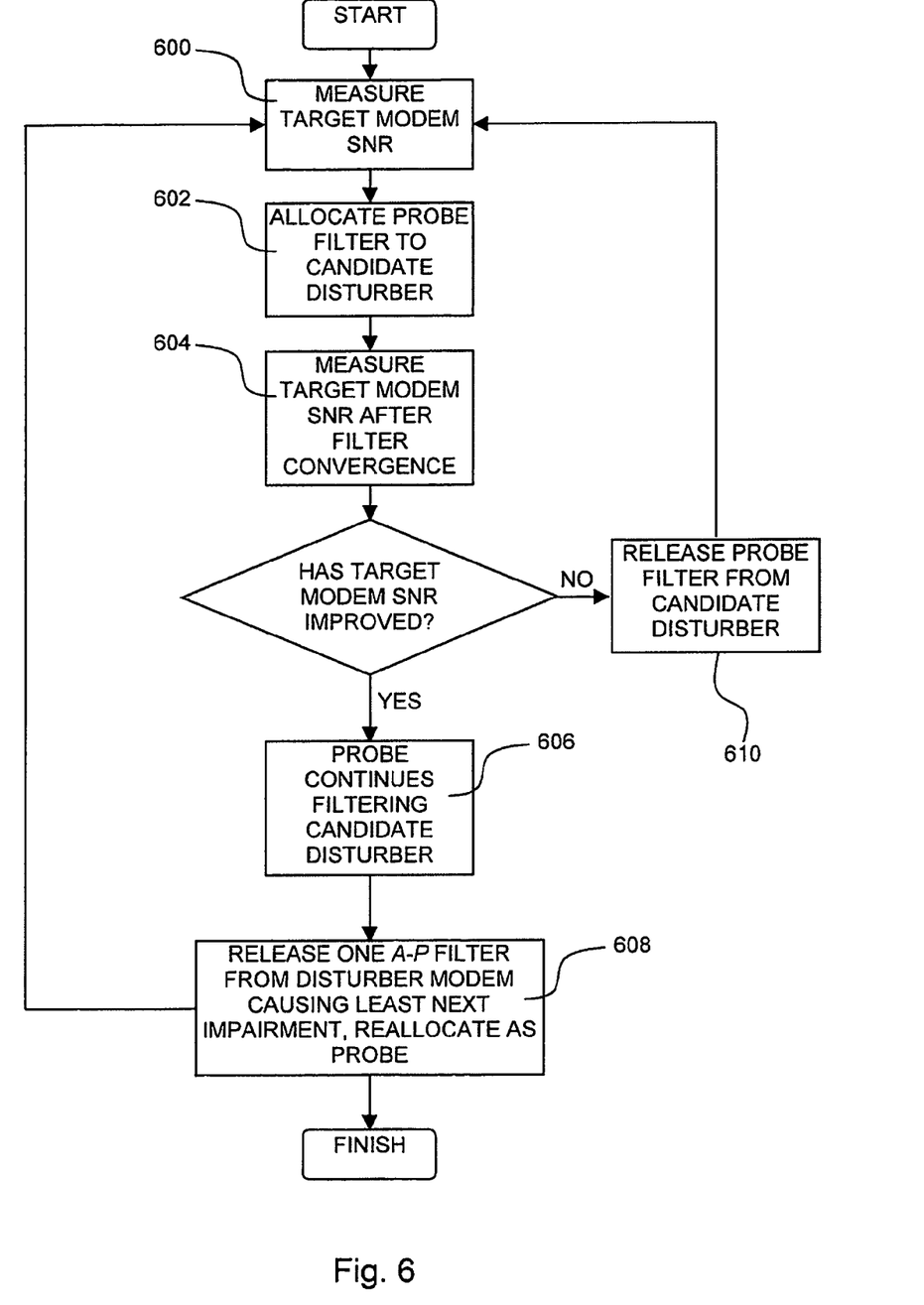
FIG. 6 is a flowchart illustration of a method of NEXT cancellation filter reallocation, operative in accordance with a preferred embodiment of the present invention.

Reference is now made to FIG. 6, which is a flowchart illustration of a method of NEXT cancellation filter reallocation, operative in accordance with a preferred embodiment of the present invention. In the method of FIG. 6 the target modem's signal-to-noise ratio (SNR) is measured using conventional techniques, such as using the modem's internal SNR meter (step 600), and one of the P probe filters is allocated to one of the candidate disturbers and begins NEXT cancellation (step 602). Once the candidate probe filter has reached convergence, the target modem's signal-to-noise ratio (SNR) is again measured (step 604). If the target modem's SNR has improved, preferably by a pre-defined value or percentage, then the probe filter joins the ranks of the allocated filters and continues filtering the candidate disturber NEXT (step 606). The NEXT cancellation filter which is currently allocated to a disturber modem causing the least NEXT impairment is then released from its disturber modem and becomes a probe in place of the newly-allocated probe filter (step 608). If the target modem's SNR has not improved, then the probe filter is released from the candidate disturber (step 610). Steps 600–610 may be repeated for each candidate disturber among the A–P disturber modems causing the greatest NEXT impairment.

Figure 7:
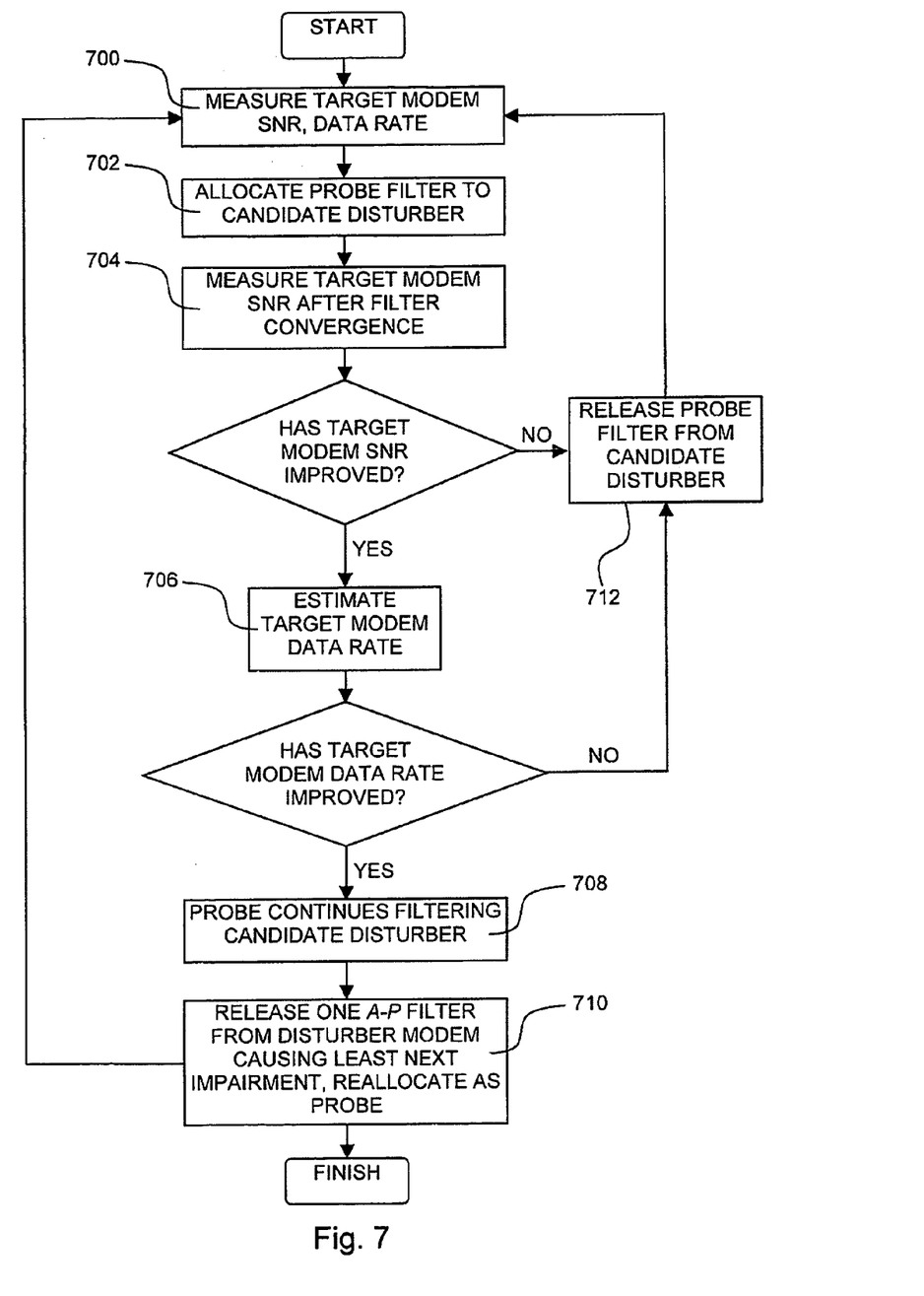
FIG. 7 is a flowchart illustration of a method of NEXT cancellation filter reallocation, operative in accordance with a preferred embodiment of the present invention.

Reference is now made to FIG. 7, which is a flowchart illustration of a method of NEXT cancellation filter reallocation, operative in accordance with a preferred embodiment of the present invention. In the method of FIG. 7 the target modem's signal-to-noise ratio (SNR) and data rate are measured using conventional techniques (step 700), and one of the P probe filters is allocated to one of the candidate disturbers and begins NEXT cancellation (step 702). Once the candidate probe filter has reached convergence, the target modem's signal-to-noise ratio (SNR) is again measured (step 704). If the target modem's SNR has improved, preferably by a pre-defined value or percentage, then the target modem's data rate is estimated using conventional techniques, such as based on a pre-determined relationship between modem SNR and data rate. (step 706). If the target modem's estimated data rate shows an improvement, preferably by a pre-defined value or percentage, then the probe filter joins the ranks of the allocated filters and continues filtering the candidate disturber NEXT (step 708). The NEXT cancellation filter which is currently allocated to a disturber modem causing the least NEXT impairment is then released from its disturber modem and becomes a probe in place of the newly-allocated probe filter (step 710). If the target modem's SNR and/or estimated data rate does not show an improvement, then the probe filter is released from the candidate disturber (step 712). Steps 700–712 may be repeated for each candidate disturber among the A–P disturber modems causing the greatest NEXT impairment.

Figure 8:
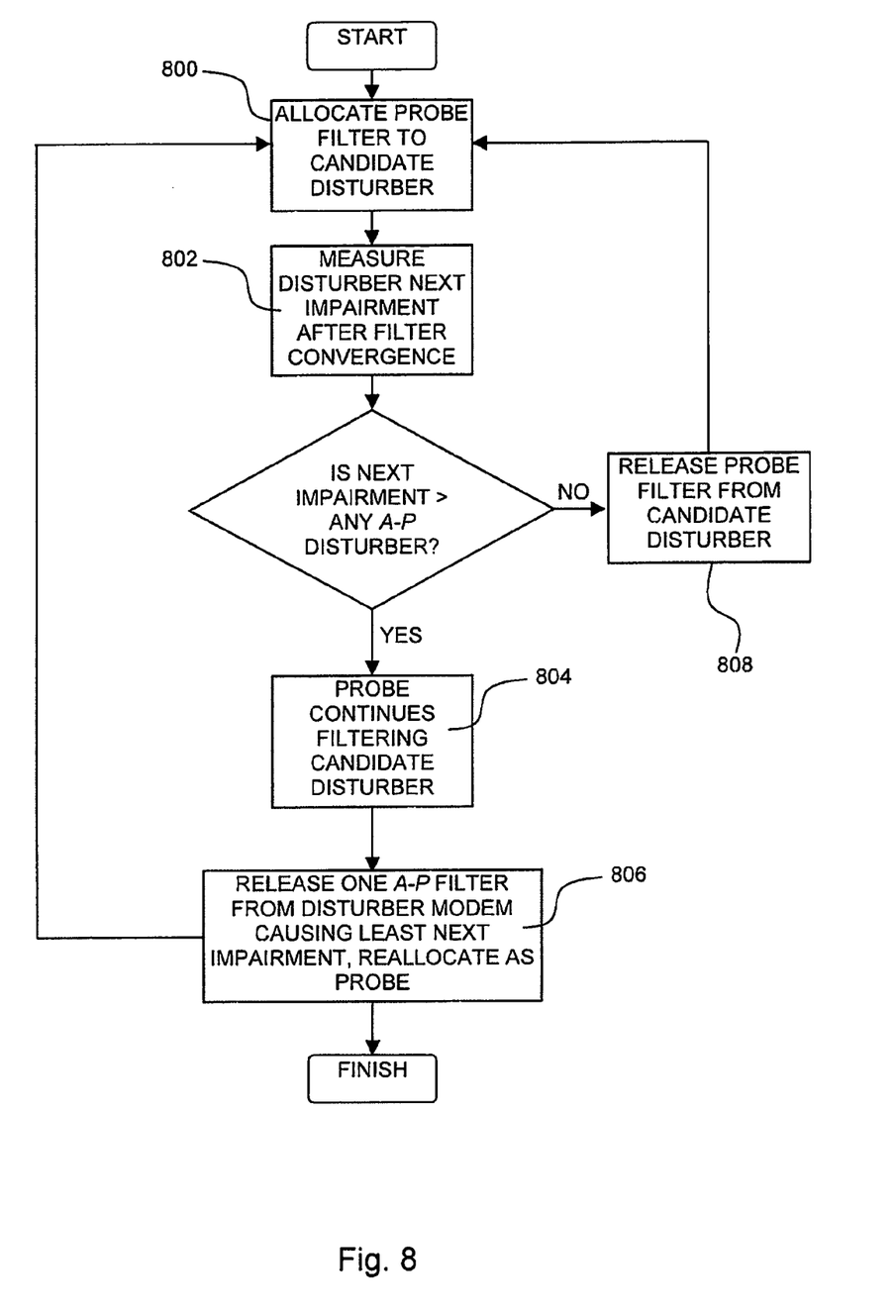
FIG. 8 is a flowchart illustration of a method of NEXT cancellation filter reallocation, operative in accordance with a preferred embodiment of the present invention.

Reference is now made to FIG. 8, which is a flowchart illustration of a method of NEXT cancellation filter reallocation, operative in accordance with a preferred embodiment of the present invention. In the method of FIG. 8 one of the P probe filters is allocated to one of the candidate disturbers and begins NEXT cancellation (step 800). Once the candidate probe filter has reached convergence, the NEXT impairment caused by the candidate disturber is measured, preferably using the absolute sum function described hereinabove with reference to FIG. 5 (step 802). If the NEXT impairment caused by the candidate disturber is greater than the NEXT impairment caused by any of the A–P disturber modems, then the probe filter joins the ranks of the allocated filters and continues filtering the candidate disturber NEXT (step 804). The NEXT cancellation filter which is currently allocated to a disturber modem causing the least NEXT impairment is then released from its disturber modem and becomes a probe in place of the newly-allocated probe filter (step 806). If the NEXT impairment caused by the candidate disturber is not greater than the NEXT impairment caused by any of the A–P disturber modems, then the probe filter is released from the candidate disturber (step 808). Steps 800–808 may be repeated for each candidate disturber among the A–P disturber modems causing the greatest NEXT impairment.

Figure 9:
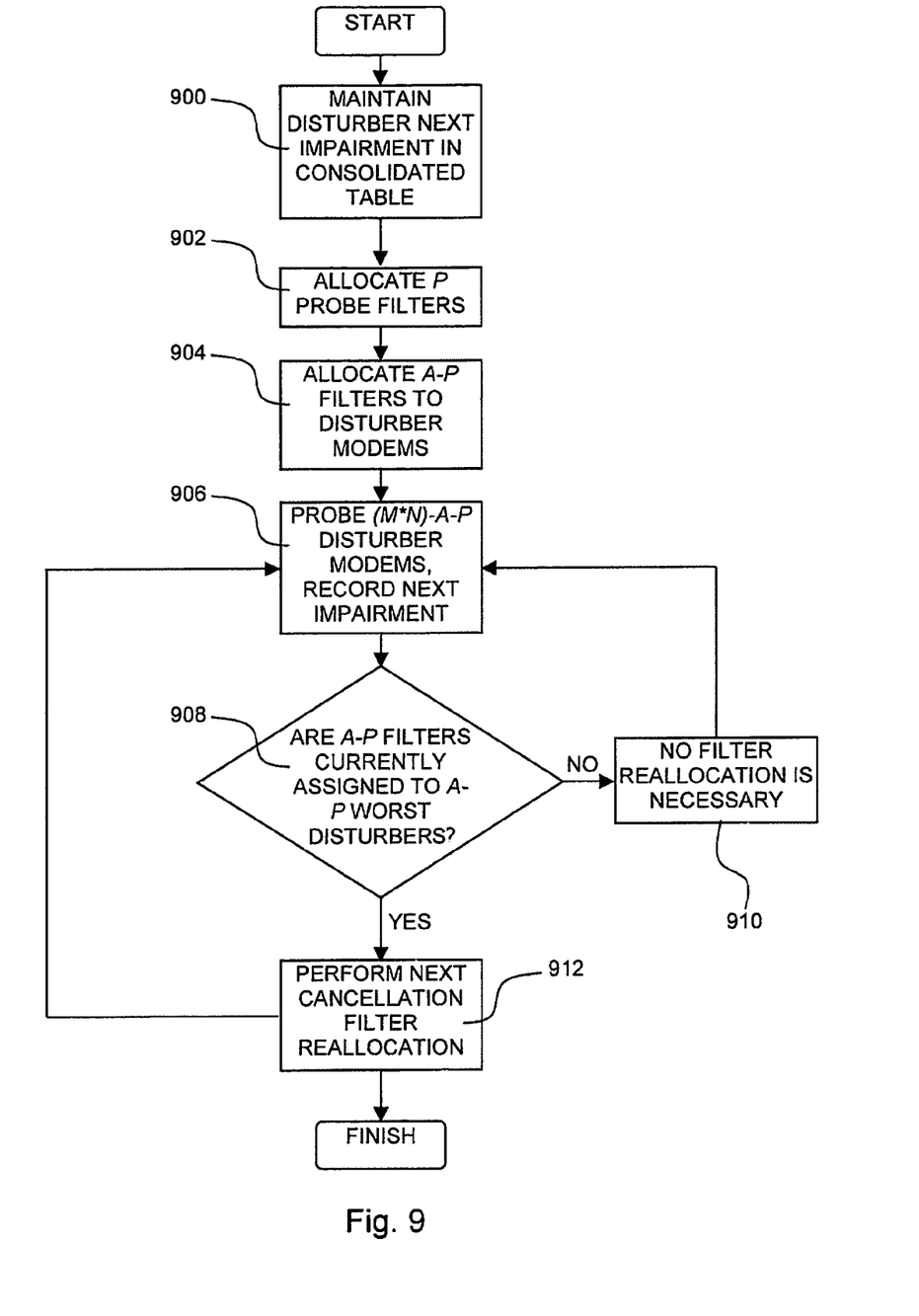
FIG. 9 is a flowchart illustration of a method of dynamic allocation of NEXT cancellation filters, operative in accordance with a preferred embodiment of the present invention.

Reference is now made to FIG. 9, which is a flowchart illustration of a method of dynamic allocation of NEXT cancellation filters, operative in accordance with a preferred embodiment of the present invention. The method of FIG. 9 may be applied to CO 10 or RT 12 of FIG. 1, or to both modem pools, and is typically applied subsequent to performing modem wake-up, such as is described hereinabove with reference to FIGS. 2 and 4. The method of FIG. 9 is particularly useful where there are fewer NEXT cancellation filters available for canceling the NEXT from disturber modems than there are disturber modems. The method of FIG. 9 differs from the method of FIG. 5 mainly in that each NEXT cancellation filter may be assigned to different target modems at different times, and that the number of NEXT cancellation filters available for a given modem may vary.

In the method of FIG. 9 a consolidated disturber table is maintained for all modems in the modem pool, or for a subset of modems, indicating the level of NEXT impairment that each modem experiences from other disturber modems in the modem pool (step 900). The NEXT impairment may be quantified using any known NEXT quantification technique, or using the absolute sum function described hereinabove with reference to FIG. 5

Where there are A NEXT cancellation filters available for M modems, each modem having N potential disturbers, and A<(M*N), P filters are preferably allocated as probe filters (step 902) where P>=1, and one or more, and preferably all, of the remaining A–P ("A minus P") filters are allocated to cancel NEXT from disturber modems, with the assignments being recorded in the disturber table (step 904). The allocation of filters to disturbers is preferably performed in order of NEXT impairment, from greatest to lowest.

After modem wake-up and initial NEXT cancellation filter allocation, and preferably throughout steady state, the P probe filters cycle through one or more, and preferably all, of the (M*N)–A–P ("(M times N) minus A minus P") disturber modems to which NEXT cancellation filters have not been allocated and measure the NEXT impairment caused by those disturber modems, with the NEXT impairment measurements being recorded in the disturber table (step 906). At any time during probing, and preferably after every C complete probing cycles where all (M*N)–A–P disturber modems have been measured, where C>=1, the disturber table is reviewed to determine whether the A–P disturber modems causing the greatest NEXT impairment are those to which the A–P NEXT cancellation filters have been allocated (step 908). If the A–P NEXT cancellation filters are currently allocated to the A–P disturber modems causing the greatest NEXT impairment, then no reallocation is necessary (step 910). If, however, one or more of the A–P disturber modems causing the greatest NEXT impairment does not currently have a NEXT cancellation filter allocated to it, hereinafter referred to as a "candidate" disturber, NEXT cancellation filter reallocation is performed (step 912), preferably using one of the methods described hereinabove with reference to FIGS. 6, 7, and 8. Whichever NEXT cancellation filter reallocation method is used, the data rate of the target modem relative to the data rate of other modems in the modem pool or subset may be taken into account when considering reallocating a NEXT cancellation filter to the target modem. For example, weighting may be used to favor reallocating a NEXT cancellation filter to a candidate disturber of a higher data rate modem over a candidate disturber of a lower data rate modem even when the latter candidate disturber causes greater NEXT impairment than the former candidate disturber. In general, a NEXT cancellation filter reallocation that is based on a target modem's data rate is desirable where it would increase the aggregated bandwidth of the modem pool or system.

It is appreciated that, in any of the methods described herein, if the ranks of the A–P disturber modems causing the greatest NEXT impairment change more rapidly than the NEXT cancellation filter reallocation techniques can adjust for, one or more probe filters may be made available for candidate disturbers, while one or more probes may continuously probe the N–A–P disturbers and update the disturbers table.

It is appreciated that one or more of the steps of any of the methods described herein may be omitted or carried out in a different order than that shown, without departing from the true spirit and scope of the invention.

It is appreciated that the methods and apparatus described herein may be implemented using computer hardware and/or software using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. In a communications system having a modem pool for communicating via a communications channel, the modem pool comprising a plurality of modems and having a plurality of near-end-crosstalk (NEXT) cancellation A filters, a method for NEXT cancellation filter allocation comprising the steps of:

a) measuring NEXT impairment caused to at least one target modem among said plurality of modems by at least one disturber modem among said plurality of modems;
b) allocating P filters among the A filters as P probe filters, where P>=1;
c) allocating at least one of the remaining A–P filters among said A filters to cancel the NEXT from the at least one disturber modem among said plurality of modems; and
d) measuring, using at least one of the P probe filters, NEXT impairment caused to the at least one target modem among said plurality of modems by at least one candidate disturber modem among plurality of modems to which no A–P filter is currently allocated.

2. A method according to claim 1 and further comprising the step of:
e) reallocating at least one currently allocated one of said A–P filters to said P probe filters.

3. A method according to claim 2 wherein said reallocating step e) comprises reallocating if the NEXT impairment caused by the at least one candidate disturber modem among said plurality of modems is greater than the NEXT impairment caused by any other disturber modem to which an A–P filter is currently allocated.

4. A method according to claim 2 wherein said reallocating step comprises reallocating any of said A–P filters to only one of said plurality of modems.

5. A method according to claim 2 and further comprising the steps of:
f) measuring a signal-to-noise ratio (SNR) of the at least one target modem prior to said allocating step b); and
g) measuring said SNR when a P probe filter has reached convergence,
and wherein said reallocating step e) is performed if said SNR measured in step g) is greater than said SNR measured in step f).

6. A method according to claim 2 and further comprising the steps of:
f) measuring a signal-to-noise ratio (SNR) and a data rate of the at least one target modem prior to said allocating step b); and
g) measuring said SNR when a P probe filter has reached convergence; and
h) estimating said data rate based on said SNR measured in step g),
and wherein said reallocating step e) is performed if said data rate estimated in step h) is greater than said data rate measured in step f).

7. A method according to claim 6 wherein said estimating step h) is performed if said SNR measured in step g) is greater than said SNR measured in step f).

8. A method according to claim 1 wherein said measuring step d) comprises measuring the NEXT impairment as the absolute sum of all NEXT cancellation filter coefficients of said at least one of the P probe filters.

9. A method according to claim 1 wherein said allocating step c) comprises allocating in order of the NEXT impairment from greater impairment to lower impairment.

10. A method according to claim 1 wherein said allocating steps b) and c) comprise allocating any of said A filters to only one of said plurality of modems.

11. A method according to claim 1 wherein said allocating steps b) and c) comprise allocating any of said A filters to at least two of said plurality of modems at different times.

12. A method according to claim 2 wherein said reallocating step comprises reallocating any of said A–P filters to at least two of said plurality of modems at different times.

13. A method according to claim 1 wherein the number of said plurality of modems is at least one more than said plurality of NEXT cancellation A filters.

14. A communications system comprising:
a modem pool for communicating via a communications channel, said modem pool comprising a plurality of modems and a plurality of near-end-crosstalk (NEXT) cancellation A filters, said modem pool being operative to:
a) measure NEXT impairment caused to at least one target modem among said plurality of modems by at least one disturber modem among said plurality of modems;
b) allocate P filters among the A filters as P probe filters, where P>=1;
c) allocate at least one of the remaining A–P filters among said A filters to cancel the NEXT impairment from the at least one disturber modem among said plurality of modems; and
d) measure, using at least one of the P probe filters, the NEXT impairment caused to the at least one target modem among said plurality of modems by at least one candidate disturber modem among said plurality of modems to which no A–P filter is currently allocated.

15. A system according to claim 14 wherein said modem pool is additionally operative to:
e) reallocate at least one currently allocated one of said A–P filters to said P probe filters.

16. A system according to claim 15 wherein said modem pool is operative to:
f) measure a signal-to-noise ratio (SNR) of the at least one target modem prior to allocating the P filters; and
g) measure said SNR when a P probe filter has reached convergence,
and perform said reallocating of the at least one currently allocated one of said A–P filters if said SNR measured of said at least one target modem when said P probe filter has reached convergence is greater than said SNR measured prior to allocating the P filters.

17. A system according to claim 15 wherein said modem pool is operative to:
f) measure a signal-to-noise ratio (SNR) and a data rate of the at least one target modem prior to performing said allocating the P filters; and
g) measure said SNR when a P probe filter has reached convergence; and
h) estimate said data rate based on said SNR measured in said SNR when said P probe filter has reached convergence,
and perform said reallocating of the at least one currently allocated one of said A–P filters if the data rate estimated in said SNR measured when said P probe filter has reached convergence is greater than said SNR measured prior to allocating the P filters.

18. A system according to claim 17 wherein said modem pool is operative to perform said estimated data rate based on said SNR measured in said SNR when said P probe filter has reached convergence if said SNR measured when said P probe filter has reached convergence is greater than said SNR measured prior to allocating the P filters.

19. A system according to claim 14 wherein said modem pool is additionally operative to reallocate if the NEXT impairment caused by said candidate disturber modem is greater than the NEXT impairment caused by any other disturber modem among said plurality of modems to which an A-P filter is currently allocated.

20. A system according to claim 14 wherein said modem pool is operative to measure the NEXT impairment as the absolute sum of all NEXT cancellation filter coefficients of said at least one of the P probe filters.

21. A system according to claim 14 wherein said modem pool is operative to allocate any of said A-P filters in order of the NEXT impairment from greater impairment to lower impairment.

22. A system according to claim 14 wherein said modem pool is operative to allocate any of said A filters to only one of said plurality of modems.

23. A system according to claim 15 wherein said modem pool is operative to reallocate any of said A-P filters to only one of said plurality of modems.

24. A system according to claim 14 wherein said modem pool is operative to allocate any of said A filters to at least one of said plurality of modems at different times.

25. A system according to claim 15 wherein said modem pool is operative to reallocate any of said A-P filters to at least two of said plurality of modems at different times.

26. A system according to claim 14 wherein the number of said plurality of modems is at least one more than said plurality of NEXT cancellation A filters.

* * * * *